United States Patent
Undavalli

(10) Patent No.: US 9,710,464 B1
(45) Date of Patent: Jul. 18, 2017

(54) LANGUAGE TRANSLATION OF ENCODED VOICE PACKETS DURING A CELLULAR COMMUNICATION SESSION

(71) Applicant: Le Technology, San Jose, CA (US)

(72) Inventor: Trinadh S Undavalli, San Diego, CA (US)

(73) Assignee: Le Technology, Inc., San Jose, CA (US)

( * ) Notice: Subject to any disclaimer, the term of this patent is extended or adjusted under 35 U.S.C. 154(b) by 0 days.

(21) Appl. No.: 15/250,664

(22) Filed: Aug. 29, 2016

(51) Int. Cl.
| | |
|---|---|
| G06F 17/28 | (2006.01) |
| G06F 17/20 | (2006.01) |
| G10L 19/00 | (2013.01) |
| G10L 21/00 | (2013.01) |
| H04W 84/12 | (2009.01) |
| H04W 88/02 | (2009.01) |

(52) U.S. Cl.
CPC ........ G06F 17/289 (2013.01); G10L 19/0018 (2013.01); *H04M 2203/2061* (2013.01); *H04M 2242/12* (2013.01); *H04W 84/12* (2013.01); *H04W 88/02* (2013.01)

(58) Field of Classification Search
CPC ..... G10L 19/008; G10L 19/24; G10L 19/167; G10L 21/038; G10L 19/0212; G06F 17/289; G06F 17/2836; G06F 17/28; G06F 17/275
USPC ......... 704/2, 3, 8, 270, 270.1, 277, 500, 501
See application file for complete search history.

(56) References Cited

U.S. PATENT DOCUMENTS

| | | | | |
|---|---|---|---|---|
| 6,161,082 A | * | 12/2000 | Goldberg .............. | G06F 17/289 704/3 |
| 6,996,068 B1 | * | 2/2006 | Sherlock ............ | G01R 31/3167 370/248 |
| 7,054,420 B2 | * | 5/2006 | Barker .................. | H04M 7/006 379/88.17 |
| 7,412,374 B1 | * | 8/2008 | Seiler .................... | G06F 17/275 704/7 |

(Continued)

OTHER PUBLICATIONS

"General Packet Radio Service (GPRS) enhancements for Evolved Universal Terrestrial Radio Access Network (E-UTRAN) access," 3rd Generation Partnership Project, Technical Specification Group Services and System Aspects, 3GPP TS 23.401, version 14.0.0, Jun. 2016, 374 pp.

(Continued)

*Primary Examiner* — Edgar Guerra-Erazo
(74) *Attorney, Agent, or Firm* — Shumaker & Sieffert, P.A.

(57) ABSTRACT

In some examples, a mobile computing device is configured to receive electronic analog audio signals, generated by an input device responsive to receiving audio input, representing one or more words in a first language; digitize the electronic analog audio signal to produce a stream of digitized audio samples; encode, with a voice encoder of the mobile computing device, the stream of digitized audio samples to generate one or more encoded voice packets; send the one or more encoded voice packets to a remote voice translation service; receive, from the remote voice translation service, one or more encoded translated voice packets, wherein the one or more encoded translated voice packets represent one or more words in a second language translated from the one or more words in the first language; and output the one or more encoded translated voice packets (Continued)

via a cellular communication session over a cellular network.

16 Claims, 6 Drawing Sheets

(56) References Cited

U.S. PATENT DOCUMENTS

| | | | |
|---|---|---|---|
| 7,715,365 B2 | 5/2010 | Yoon et al. | |
| 8,290,779 B2 | 10/2012 | Hoefelmeyer et al. | |
| 8,463,612 B1* | 6/2013 | Neath | H04L 65/1083 370/352 |
| 8,468,010 B2* | 6/2013 | Chaturvedi | G06F 17/28 704/2 |
| 9,128,927 B2* | 9/2015 | Chaturvedi | G06F 17/28 |
| 2002/0022498 A1 | 2/2002 | Hokao | |
| 2002/0131369 A1* | 9/2002 | Hasegawa | H04L 41/12 370/241 |
| 2009/0327516 A1* | 12/2009 | Amishima | H04L 65/1069 709/238 |
| 2010/0049980 A1* | 2/2010 | Barriga | H04L 12/66 713/171 |
| 2010/0185434 A1* | 7/2010 | Burvall | G06F 17/289 704/3 |
| 2012/0078609 A1* | 3/2012 | Chaturvedi | G06F 17/28 704/3 |
| 2013/0332144 A1* | 12/2013 | Chaturvedi | G06F 17/28 704/2 |

OTHER PUBLICATIONS

"Evolved Universal Terrestrial Radio Access (E-UTRA) and Evolved Universal Terrestrial Radio Access Network (E-UTRAN) Overall Description," 3rd Generation Partnership Project, Technical Specification Group Radio Access Network, 3GPP TS 36.300, version 13.4.0, Jun. 2016, 310 pp.

"Study on S2a Mobility based on GTP & WLAN access to EPC (SaMOG)," Technical Specification Group Services and System Aspects, 3rd Generation Partnership Project, 3GPP TS 23.852, Release 11, Dec. 2011, 40 pp.

3rd Generation Partnership Project,"Universal Mobile Telecommunications System (UMTS); Quality of Service (QoS) concept and architecture," European Telecommunications Standards Institute, 3GPP TS 23.107, version 5.4.0, Release 5, Mar. 2002, 42 pp.

* cited by examiner

LANGUAGE TRANSLATION OF ENCODED VOICE PACKETS DURING A CELLULAR COMMUNICATION SESSION

TECHNICAL FIELD

The disclosure relates to cellular networks, and more particularly, to translating voice packets for transport by a cellular network.

BACKGROUND

Wireless computing devices provide a platform for both cellular phone calls and cellular-based access to computer data services. For example, a typical cellular radio access network is a collection of cells that each includes at least one base station capable of transmitting and relaying signals to subscribers' wireless devices. A "cell" generally denotes a distinct area of a mobile network that utilizes a particular frequency or range of frequencies for transmission of data. A typical base station is a tower to which are affixed a number of antennas that transmit and receive the data over the particular frequency. Wireless devices, such as cellular or mobile phones, smart phones, camera phones, personal digital assistants (PDAs) and laptop computers, may initiate or otherwise transmit a signal at the designated frequency to the base station to initiate a call or data session and begin transmitting data.

Mobile service provider networks convert cellular signals, e.g., Time Division Multiple Access (TDMA) signals, Orthogonal Frequency-Division Multiplexing (OFDM) signals, Frequency Division Multiple Access (FDMA), or Code Division Multiple Access (CDMA) signals, received at a base station from wireless devices into Internet protocol (IP) packets for transmission within packet-based networks. A number of standards have been proposed to facilitate this conversion and transmission of cellular signals to IP packets, such as a general packet radio service (GPRS) standardized by the Global System for Mobile Communications (GSM) Association, a Universal Mobile Telecommunications System (UMTS) architecture, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the Worldwide Interoperability for Microwave Access (WiMAX) forum.

A typical 3GPP mobile service provider network, also "mobile network" or "cellular network," includes a core packet-switched network, a transport network, and one or more radio access networks. The core packet-switched network for the mobile network establishes logical connections, known as bearers, among the many service nodes on a path between a wireless device, attached to one of the radio access networks, and a packet data network (PDN). The service nodes then utilize the bearers to transport subscriber traffic exchanged between the wireless device and the PDN, which may include, for example, the Internet, an enterprise intranet, a layer 3 VPN, and a service provider's private network. Various PDNs provide a variety of packet-based data services to wireless devices to enable the wireless devices to exchange subscriber data with application or other servers of the PDNs. The increasing number of services available to an increasing number of mobile subscriber devices pressures available mobile network resources.

The ubiquitous use of wireless devices and the ever-increasing desire by users for fast network access from around the world has presented many challenges. For example, the ubiquitous use of cellular wireless devices have placed a high demand for data services over the service provider's mobile network, often straining the mobile network and resulting in delayed or lost data communications. Some wireless devices, in addition to supporting connections to a PDN via a radio interface to the cellular mobile network, also support wireless capabilities to exchange data via an alternate access network (a "non-mobile network") that is separate from the cellular network of the mobile service provider. For example, many wireless devices include a wireless local area network (WLAN) interface that provides data service when in the presences of a Wi-Fi "hotspot" or other wireless access point (WAP). Other examples of such wireless capabilities may include Bluetooth or Near Field Communication (NFC).

SUMMARY

In general, techniques are described for obtaining translated audio, for audio encoded on a source computing device by a voice codec to an audio stream and translated by a remote translation service, for delivery to a destination computing device. For example, a source computing device, such as a cellular phone, may establish a cellular communication session via a cellular network with a destination computing device. The source computing device receives audio input from a user representing speech, generates an analog electronic audio signal, converts the analog electronic signal to a stream of digitized audio samples, e.g., a pulse code modulation (PCM) bitstream, and encodes the digitized audio samples using a voice codec to generate encoded voice packets. The encoded voice packets are internally intercepted prior to processing by a radio modem subsystem of the mobile computing device for transmission as radio signals and, instead, re-directed to a remote voice translation service, e.g., a cloud-based voice translation service. In this way, the source computing device may leverage the voice coding subsystem of the source computing device to shunt encoded voice packets for the cellular communication session to the remote translation service via a secondary data channel for translation. The remote voice translation service decodes the encoded voice packets back into a stream of digitized audio samples, and then directs the digitized audio samples to a voice translator that translates the decoded audio signals representing speech in a source language to speech in a destination language in order to generate translated audio signals. The remote translation service may return the translated audio signals, at least in some cases in encoded form as encoded voice packets, to the source computing device. In response, the source computing device injects the returned encoded voice packets into the radio modem subsystem for transmission on the established cellular communication session.

As a result of the techniques, users of the source computing device and destination computing device may communicate to one another using their respective and different desired languages. In addition, by anchoring the translation data path and the cellular communication session at the source computing device, the techniques may in some cases avoid active participation by the mobile service provider in delivering encoded translated audio signals from the translation service to the destination computing device. At least in some cases, by encoding the audio signals using a voice encoder prior to sending the encoded audio signals to the translation service, the techniques may reduce an amount of data uploaded to the translation service for translation.

In one example, a mobile computing device comprises a memory; and at least one processor operably coupled to the memory, the memory configured with instructions for causing the at least one processor to receive electronic analog audio signals, generated by an input device responsive to receiving audio input, representing one or more words in a first language; digitize the electronic analog audio signal to produce a stream of digitized audio samples; encode, with a voice encoder of the mobile computing device, the stream of digitized audio samples to generate one or more encoded voice packets; send the one or more encoded voice packets to a remote voice translation service; receive, from the remote voice translation service, one or more encoded translated voice packets, wherein the one or more encoded translated voice packets represent one or more words in a second language translated from the one or more words in the first language; and output the one or more encoded translated voice packets via a cellular communication session over a cellular network.

In another example, a method comprises receiving, by a mobile computing device, electronic analog audio signals, generated by an input device responsive to receiving audio input, representing one or more words in a first language; digitizing, by the mobile computing device, the electronic analog audio signal to produce a stream of digitized audio samples; encoding, by the mobile computing device with a voice encoder, the stream of digitized audio samples to generate one or more encoded voice packets; sending, by the mobile computing device, the one or more encoded voice packets to a remote voice translation service; receiving, by the mobile computing device from the remote voice translation service, encoded translated voice packets, wherein the one or more encoded translated voice packets represent one or more words in a second language translated from the one or more words in the first language; and outputting, by the mobile computing device, the one or more encoded translated voice packets via a cellular communication session over a cellular network.

In another example, a mobile computing device comprises a memory; and at least one processor operably coupled to the memory, the memory configured with instructions for causing the at least one processor to: receive, via a cellular communication session over a cellular network, one or more encoded voice packets representing one or more words in a first language; send the one or more encoded voice packets to a remote voice translation service; receive, from the remote voice translation service, one or more encoded translated voice packets that represent one or more words in a second language translated from the one or more words in the first language; decode, with a voice decoder of the mobile computing device, the one or more encoded translated voice packets to obtain a stream of digitized audio samples; and output, for output as audio signals by an output device, the stream of digitized audio samples.

In another example, a system comprises one or more translation servers configured to execute a remote translation service; a mobile computing device configured to: receive electronic analog audio signals, generated by an input device responsive to receiving audio input, representing one or more words in a first language; digitize the electronic analog audio signal to produce a stream of digitized audio samples; encode, with a voice encoder of the mobile computing device, the stream of digitized audio samples to generate one or more encoded voice packets; and send the one or more encoded voice packets to a remote voice translation service wherein the one or more translation servers are configured to: receive the one or more encoded voice packets; decode the one or more encoded voice packets to obtain the stream of digitized audio samples; translate the one or more words in a first language to one or more words in a second language; synthesize the one or more words in the second language to generate a translated stream of digitized audio samples; encode the translated stream of digitized audio samples to generate encoded translated voice packets; and send the encoded translated voice packets to the mobile computing device, wherein the mobile computing device is configured to output, via a cellular communication session over a cellular network, the encoded translated voice packets.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference characters denote like elements throughout the figures and text.

DETAILED DESCRIPTION

Figure 1:
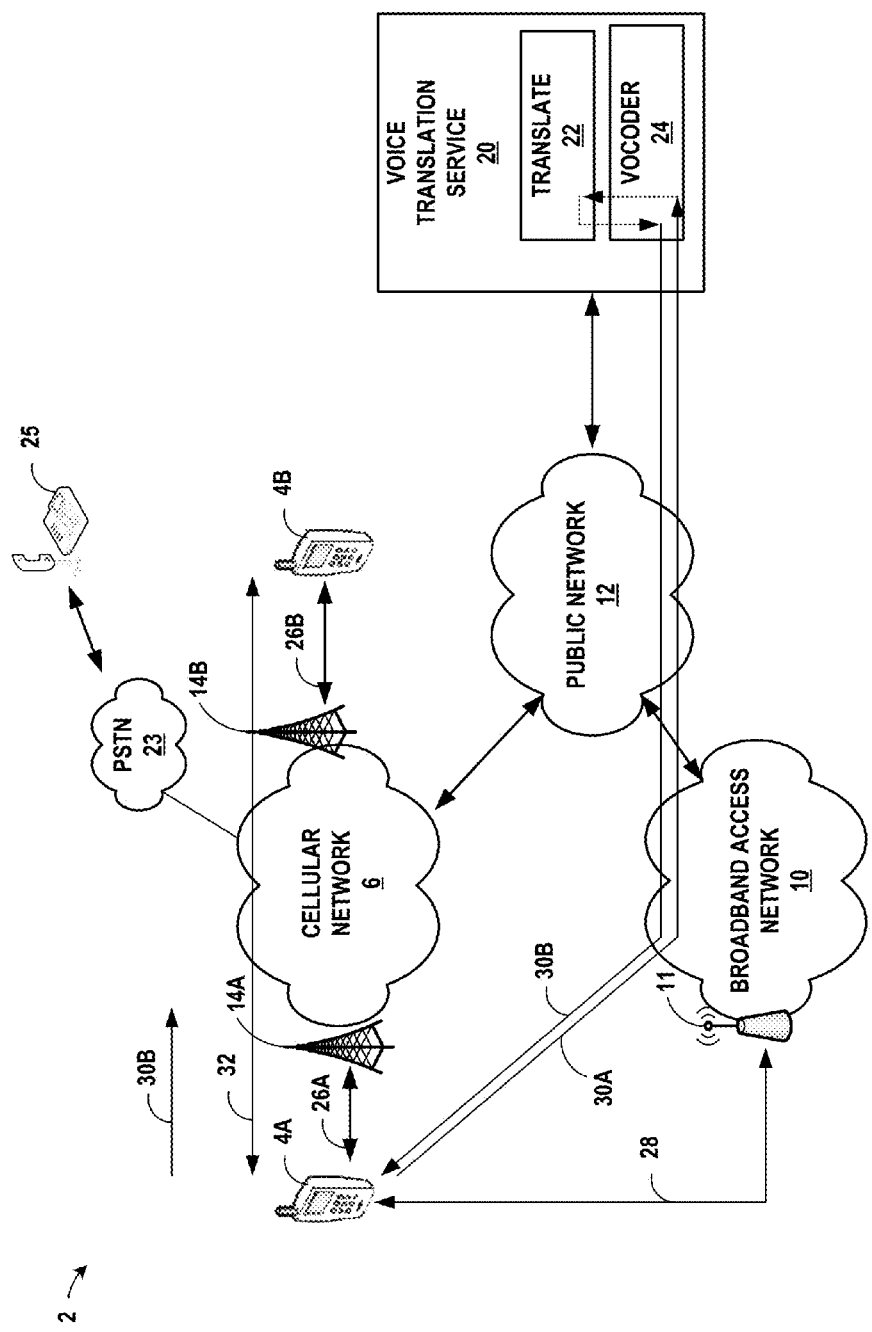
FIG. 1 is a block diagram illustrating an example system for remote translation according to techniques described herein.

FIG. 1 is a block diagram illustrating an example system that supports remote, real-time voice translation of telephone calls between telephonic devices according to techniques described herein. As further described, fully-formed voice encoded packets may be intercepted within a mobile computing device prior to radio transmission and redirected to remote voice translation service for real-time voice translation of the active telephone call.

In this example, network system 2 includes mobile computing device 4A-4B that communicate with a cellular network 6 to receive cellular services. Subscribers associated with respective mobile computing devices 4 may subscriber to a service provider to receive the cellular voice, and in some cases cellular data services, provided cellular network 6.

Mobile computing devices 4 are wireless communication devices that may each comprise, for example, a mobile telephone, a laptop or desktop computer having, e.g., a 3G/4G wireless card, a wireless-capable netbook, a gaming device, a smart phone, or a personal data assistant (PDA). Mobile computing device 4 may run one or more applications, such as VoIP clients, video games, videoconferencing, E-mail, and Internet browsers, among others. Mobile computing devices 4 may also be referred to, in various architectural embodiments, as User Equipment (UE) or Mobile Stations (MS).

A service provider operates cellular network 6 to provide cellular voice, and in some cases cellular data services, to mobile computing devices 4. In this respect, cellular network 6 may represent a Public Land Mobile Network (PLMN). In general, cellular network 6 may implement any commonly defined cellular network architecture including those defined by standards bodies, such as Global System for Mobile communication (GSM) Association, a $3^{rd}$ Generation Partnership Project (3GPP), $3^{rd}$ Generation Partnership Project 2 (3GGP/2), Internet Engineering Task Force (IETF), and Worldwide Interoperability for Microwave Access (WiMAX) forum. For example, cellular network 6 may implement one or more of a GSM architecture, a General Packet Radio Service (GPRS) architecture, a Universal Mobile Telecommunications System (UMTS) architecture, and an evolution of UMTS referred to as Long Term Evolution (LTE), each of which are standardized by 3GGP. Cellular network 6 may, alternatively or in conjunction with one of the above, implement a Code Division Multiple Access-2000 ("CDMA2000") or Enhanced Data Rates for GSM Evolution (EDGE) architecture. Cellular network 6 may, again as an alternative or in conjunction with one or more of the above, implement a WiMAX architecture defined by the WiMAX forum.

In some examples, cellular network 6 may comprise a core packet-switched network (not shown in FIG. 1) and one or more radio access networks (also not shown in FIG. 1, with the exception of base stations 14A, 14B). The core packet-switched network of cellular network 6 may comprise, for example, a general packet radio service (GPRS) core packet-switched network, an IP-based mobile multimedia core network, or an Evolved Packet Core (EPC) or Evolved Packet System (EPS). The core packet-switched network of cellular network 6 comprises intermediate devices required to implement the protocols of the particular architectural embodiment of cellular network 6, such as Serving GPRS Serving Nodes (SGSNs), Serving Gateways (SGWs) and Mobility Management Entities (MMEs). Mobile computing devices 4 establish a voice communication session using cellular network 6 using respective wireless communication links to respective base stations 14A-14B of one or more radio access networks of cellular network 6 in the example of FIG. 1. However, in various examples, mobile computing devices 4 may be attached to different cellular networks, attached to the same base station, or otherwise establish a voice communication session using one or more cellular networks. Using voice communication session, mobile computing devices 4 may exchange audio signals to enable respective users of the mobile computing device 4 to communicate.

Radio access networks of cellular network 6 may include, for example a GSM Radio Access Network (GRAN), a WiMAX radio access network, a UMTS Radio Access Network (UTRAN), and/or an evolution of a UTRAN known as an E-UTRAN. In this example, one or more radio access networks of cellular network 6 includes base stations 14. Base stations 14 may each be a Node B or eNode B base transceiver station that uses an air interface to communicate with user equipment (e.g., mobile computing devices 4) in the geographic region (or "cell") that the base station serves. In some examples, either or both of base stations 14 may be a femtocell. In some examples, either or both of base stations 14 may be another type of wireless transceiver station, such as a site controller or a WiMAX access point. Cellular network 6 may further include a backhaul or transport network (not shown) that includes land-based transmission lines, frequently leased by a service provider for the mobile network, to transport user and control traffic between mobile computing device 4 and a mobile gateway (not shown in FIG. 1) of the cellular network. The backhaul network also includes network devices such as aggregation devices and routers. Base stations 14 may have a maximum range of multiple kilometers.

Cellular network 6 may establish and operate bearers to transport user traffic, in the form of PDP packet data units (PDUs), referred to hereinafter as "packets." In general, a bearer is a set of network resources and data transport functions to deliver user traffic between two network entities. A bearer may include a path, a logical connection, or a physical or wireless connection between two network devices. A bearer may comprise, for example, an Evolved Packet System (EPS) bearer. Further details regarding bearer setup and management are found in "3GPP TS 23.401— General Packet Radio Service (GPRS) enhancements for Evolved Universal Terrestrial Radio Access Network," version 14.0.0, 3rd Generation Partnership Project, Technical Specification Group Services and System Aspects, June 2016, and 3GPP TS 36.300—Evolved Universal Terrestrial Radio Access (E-UTRA) and Evolved Universal Terrestrial Radio Access Network Evolved Universal Terrestrial Radio Access Network (E-UTRAN) Overall Description," version 13.4.0, 3rd Generation Partnership Project, Technical Specification Group Radio Access Network, Jul. 7, 2016, the entire contents of each being incorporated herein by reference. A bearer to transport user packets between mobile computing device 4 for the voice communication session may include respective radio bearers 26A, 26B for the wireless links connecting mobile computing devices 4 to base stations 14.

System 2 includes a public network 12 and a broadband access network 10. Although shown as separate networks 12 and 14, public network 12 may include portions of broadband access network 10. In other words, some portions of broadband access network 10 may form some portions of public network 12. Public network 12 may represent any publicly-accessible network, including what is commonly referred to as the "Internet." The same service provider, or different service providers, may operate cellular network 6 and broadband access network 6.

Broadband access network 10 may represent a wireless broadband network that provides access to public network 12 via a physical communication medium, such as a coaxial cable, optical fiber, or copper telephone line. A service provider may operate broadband access network 10, providing different levels of service to subscribers for accessing public network 12. The different levels of service may include different amounts of bandwidth per month (e.g., 100 megabytes (MB)/month, 200 MB/month, etc.), different levels of volume of data, different levels of throughput (which may be marketed as different amounts of data per second, e.g., 20 megabits per second (Mbps), 40 Mbps, 100 Mbps, etc.), different levels of latency, or a combination of one or more of the foregoing. The different levels of service may be arranged in a large number of ways (and marketed as "service plans") to achieve different goals and serve different types of customers (e.g., business customers or residential customers).

Broadband access network 10 may further include a backend network, which is not shown in the example of FIG. 1 for ease of illustration purposes, configured to provide a number of different network support services to facilitate access to the services provided by broadband access network 10. For example, the backend network may include a dynamic host configuration protocol (DHCP) server configured to execute DHCP and thereby distribute unique network addresses to mobile computing device 4A. The distribution of unique network addresses allows for proper routing of network packets to individual subscriber devices.

In the example of FIG. 1, mobile computing device 4A connects to broadband access network 10 via wireless access point 11 to access public network 12. Wireless access point 11 communicates wirelessly with mobile computing device 4A. Wireless access point 11 may represent a Wi-Fi-capable device connected to broadband access network 14. Wireless access point 11 may connect to customer-premises equipment (CPE) or may represent CPE having integrated wireless capability (e.g., a wireless router). Wireless access point 11 may have a relatively limited maximum range for wireless communication, e.g., less than 100 meters. Mobile computing device 4A may establish a wireless communication session 28 with wireless access point 11. The wireless communication session 28 may include a Wi-Fi session or another short-range wireless communication session for wirelessly accessing the broadband access network 10. Wireless communication session 28 may operate according to any of the IEEE standards that govern wireless networking transmission methods, such as IEEE 802.1a, 802.11b, 802.11g, and/or 802.11, for instance.

In accordance with techniques of this disclosure, in response to initiation by one of mobile computing devices 4 and acceptance by the other one of mobile computing devices 4, cellular network 6 establishes a cellular communication session 32 to transport encoded audio signals between mobile computing device 4A and mobile computing device 4B. In this example, cellular communication session 32 represents a cellular phone call between the two mobile computing devices 4.

During operation, mobile computing device 4A digitizes spoken audio spoken by a user of mobile computing device 4A into audio signals. Mobile computing device 4A encodes the audio signals, using a voice encoder, to generate encoded audio signals. Mobile computing device 4A enables an optional voice translation for cellular communication session 32 that, if selected, causes mobile computing device 4A to send the encoded audio signals to voice translation service 20 for translation of the encoded audio signals to a different, target language. More specifically, mobile computing device 4A sends the encoded audio signals within one or more encoded voice packets 30A via broadband access network 10 to voice translation service 20. The one or more encoded voice packets 30A may be transported within Internet Protocol (IP) packets that include the encoded audio signals for transport on an IP infrastructure represented by broadband access network 10 and public network 12. The one or more encoded voice packets 30A may represent Voice-over-IP (VoIP) packets that include the encoded audio signals in accordance with a Real-time Transport Protocol (RTP). As used herein, an "encoded voice packet" describes data that represents digital audio signals, received by a mobile computing device and encoded and compressed by a voice encoder and packetized for communication in a communication session over a network, such as a cellular communication session 32 or a VoIP session. An encoded voice packet may represent an encoded audio frame or a VoIP packet payload, for example.

Voice translation service 20 translates speech spoken in a source language into semantically similar speech spoken in a target language. Voice translation service 20 may be executed by one or more real or virtual servers accessible to mobile computing device 4A via broadband access network 10, for example. Voice translation service 20 may be deployed to a public, private, or hybrid cloud and may be deployed by a cloud service provider.

In response to receiving the one or more encoded voice packets 30A including encoded audio signals from mobile computing device 4A, vocoder 24 decodes the encoded audio signals using an audio decoder to obtain the audio signals. The audio may represent audio spoken, sung, or otherwise vocalized by a human or other animal, synthesized and output by a machine, or other forms of audio that represents a language. Vocoder 24 provides the audio signals to translate module 22 of voice translation service 20, which may recognize speech in the source language and convert the speech to data representing words in the source language. Translate module 22 may then process the data to determine translated data representing words in a target language (different from the source language) that express a similar meaning to that of the words in the source language. Translate module 22 may then synthesize the translated data to translated audio signals.

In some examples, vocoder 24 of voice translation service 20 may re-encode the translated spoken audio using a voice encoder to generate encoded translated audio signals. Voice translation service 20 may return the encoded translated audio signals to mobile computing device 4A included in one or more encoded translated voice packets 30B, which may conform to protocol encapsulation similar to those of encoded voice packets 30A. As used herein, an "encoded translated voice packet" describes data that represents digital audio signals that represent words translated by a translation service, the digital audio signals encoded and compressed by a voice encoder and packetized for communication in a cellular communication session.

In some examples, translate module 22 and vocoder 24 may be executed by different servers owned and operated by different entities and, for example, may be chained cloud-based web services hosted by the different entities. For instance, vocoder 24 may be a web service operated by a mobile service provider or application service provider to decode voice packets to obtain the digital audio signals, which vocoder 24 may then send to a translate module 22 executed by a different server for translation. Translate module 22 may be a web service operated by a different application service provider that is able to translate raw audio signals on behalf of vocoder 24 but may be unable to translate encoded audio signals, e.g., encoded voice packets 30A.

Mobile computing device 4A receives encoded translated voice packets 30B and, in lieu of the encoded audio signals (e.g., voice packets 30A) earlier generated by mobile computing device 4A, sends the encoded translated audio signals by cellular network 6 via cellular communication session 32 including radio bearer 26A to mobile computing device 4B. Mobile computing device 4B may decode the encoded translated audio signals for output to a user of the mobile computing device 4B and, in this way, network system 2 may facilitate spoken audio language translation between users of mobile computing devices 4. The encoded translated audio signals may correspond to the encoded audio signals in that the translated audio signals represent words in a target language translated from words in a source language and represented in the audio signals. By using a separate data path from the cellular communication session, the techniques may in some cases avoid active participation by the cellular network 6 service provider in delivering translated audio signals from the voice translation service 20 to the destination computing device. This may reduce an amount of cellular network bandwidth used for the translation. In addition, by sending encoded voice signals, encoded using a voice encoder, rather than raw audio signals to the translation service, the techniques may reduce an amount of data uploaded to the voice translation service 20 for translation.

Although not illustrated explicitly in FIG. 1, mobile computing device 4B and voice translation service 20 may perform, for the cellular communication session, operations similar to those described above with respect to mobile computing device 4A and voice translation service 20, though using reciprocal source and target languages. For example, mobile computing device 4A and voice translation service 20 may translate English spoken audio to Chinese spoken audio for a cellular communication session, while mobile computing device 4B and voice translation service 20 may translate Chinese spoken audio to English spoken audio for the cellular communication session. In such examples, mobile computing devices 4A, 4B may facilitate communication between the users by enabling two-way voice-to-voice language translation.

In some examples, broadband access network 10 may be an "alternate access network" or trusted non-3GPP access representing a WLAN or other Wi-Fi network and connect to a mobile gateway of cellular network 6 via a SaMOG-based gateway to enable access by mobile computing device 4A to public network 12 and voice translation service 20. SaMOG techniques are described further in "Study on S2a Mobility based On GTP & WLAN access to EPC (SaMOG)," 3rd Generation Partnership Project, Technical Specification Group Services and System Aspects, Stage 2 (Release 11), which is incorporated by reference in its entirety herein.

In some examples, mobile computing device 4A establishes a VoIP communication session over broadband access network 10 with mobile computing device 4B. In such examples, mobile computing device 4A may apply the techniques described above to output translated encoded voice packets 30B via the VoIP communication session rather than the cellular communication session 32.

Further, in some examples, mobile computing device 4A may establish call sessions with a telephone 25 physically connected to public switched telephone network (PSTN) 23, which generally represents circuit-switched telephone networks that are operated by national, regional, or local telephony operators, providing infrastructure and services for public telecommunication. In such examples, the techniques described above may similarly be applied for real-time, voice translation of the telephone call between mobile computing device 4A and telephone 25. At least in some cases, the telephone call between mobile computing device 4A and telephone 25 traverses a bearer of the cellular network 6 and therefore includes a cellular communication session.

In some examples, in addition to or alternatively to obtaining encoded translated voice packets 30B for encoded voice packets 30A, mobile computing device 4A may send, for translation, encoded audio signals within one or more encoded voice packets received from mobile computing device 4B via cellular communication session 32. In this way, mobile computing device 4A may obtain encoded translated voice packets even if mobile computing device 4B (or telephone 25 in some examples) is unable to send encoded translated voice packets cellular communication session 32. In such examples, mobile computing device 4A may send the received encoded voice packets via broadband access network 10 to voice translation service 20, and receive encoded translated voice packets via broadband access network 10 in response. Mobile computing device 4A may decode the encoded translated audio signals in the received encoded translated voice packets to obtain translated audio signals for output, e.g., via an output device such as a speaker, to a user of the mobile computing device 4A. In this way, network system 2 may facilitate spoken audio language translation between users of mobile computing devices 4. In such examples, the source language for purposes of translation may refer to the language corresponding to audio obtained at mobile communication devices 4B, while the target language may refer to the language represented in audio signals output by mobile communication device 4A.

Figure 2:
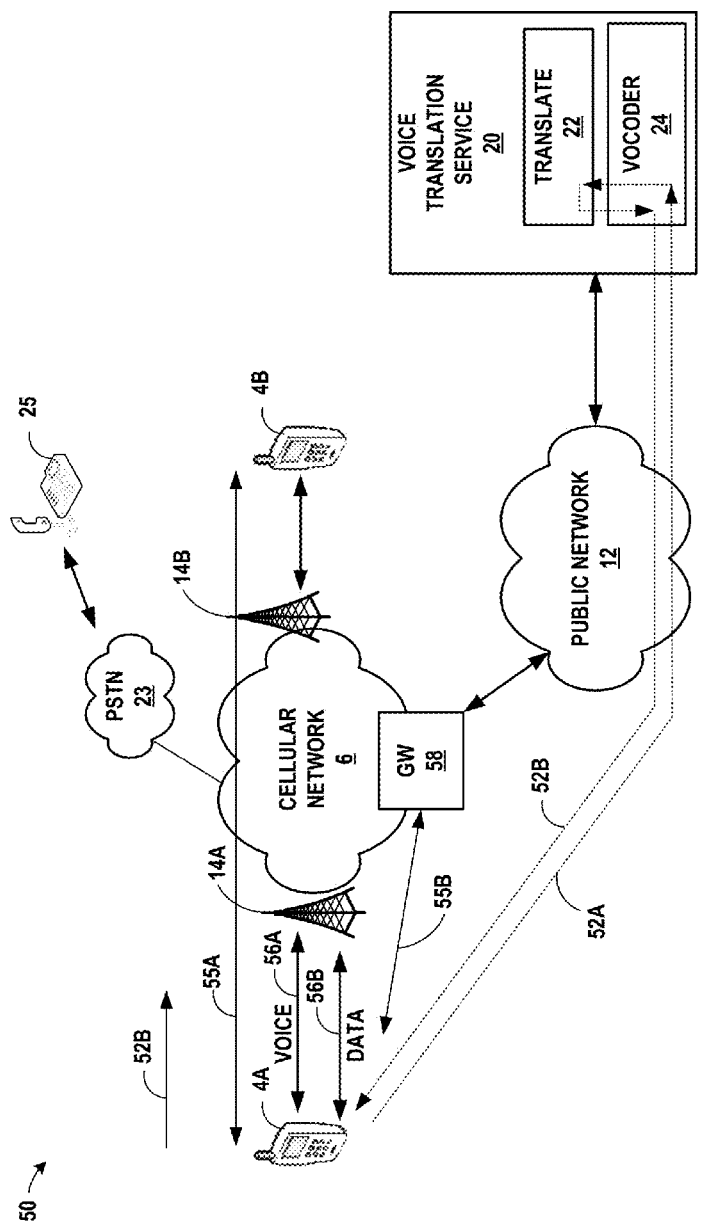
FIG. 2 is a block diagram illustrating an example system for remote translation according to techniques described herein.

FIG. 2 is a block diagram illustrating an example system for remote translation according to techniques described herein. In this example system 50, cellular network 6 includes a mobile gateway 58 that provides network access and packet forwarding between cellular network 6 and external public network 12 (an example of a packet data network (PDN)). Mobile gateway 58 is a termination point of the packet data interface of cellular network 6 toward public network 12 and functions as the anchor point for mobile computing device 4A mobility. Mobile gateway 58 may apply policy and charging rules to subscriber data traffic between the public network 12 and mobile computing device 4A to perform charging functionality and manage service connections to ensure an efficient utilization of core, transport, and radio network resources. Different services, such as Internet, E-mail, voice, and multimedia, have different quality of service (QoS) requirements that vary by user. Mobile gateway 58, base stations 14, and other devices of cellular network 6 enforce QoS requirements for different services. Mobile gateway 58 may represent a PDN gateway (PGW) or a Gateway General Packet Radio Service (GPRS) Support Node (GGSN), for instance.

In this example, mobile computing device 4A sends encoded audio signals to voice translation service 20 via radio bearer 56B. Radio bearer 56B may underlie a data channel that provides streaming class or interactive class Quality of Service (QoS) to transport non-voice services between base station 14A and mobile computing device 4A. Radio bearer 56A, on the other hand, may underlie a voice channel that provides conversational class Quality of Service (QoS) to transport voice services between base station 14A and mobile computing device 4A. Each of radio bearers 56A, 56B may represent a different Dedicated Traffic Channel (DTCH) according to UMTS defined by 3GPP. Quality of Service classes for UMTS radio access bearers, which each include a radio bearer, are described in 3GPP TS 23.107, "Universal Mobile Telecommunications System (UMTS); Quality of Service (QoS) concept and architecture," version 5.4.0, Release 5, March, 2002, which is incorporated by reference herein in its entirety. Different mobile architecture standards may use different QoS classes to differentiate QoS for voice delivery from QoS for data delivery.

Cellular network 6 establishes cellular communication session 55B for transporting packets between mobile computing device 4A and gateway 58. Cellular communication session 55B may represent a connectivity access network (CAN) session (e.g., an IP-CAN session) and may include a Packet Data Protocol (PDP) bearer, an Evolved Packet System (EPS) bearer, or another end-to-end bearer implemented by cellular network 6 and mobile computing device 4A to deliver packets from mobile computing device 4A to public network 12 and to deliver packets from public network 12 to mobile computing device 4A. Cellular communication session 55B may transport communications using radio bearer 56B. Cellular communication session 55B may include a data channel.

In accordance with techniques of this disclosure, in response to initiation by one of mobile computing devices 4 and acceptance by the other one of mobile computing devices 4, cellular network 6 establishes a cellular communication session 55A to transport encoded audio signals between mobile computing device 4A and mobile computing device 4B. Cellular communication session 55A may represent a cellular phone call and may transport communications using radio bearer 56A. Cellular communication session 55A may include a voice channel.

Mobile computing device 4A digitizes spoken audio spoken by a user of mobile computing device 4A into audio signals. Mobile computing device 4A encodes the audio signals, using a voice encoder, to generate encoded audio signals and then sends the encoded audio signals to voice translation service 20 for translation of the encoded audio signals to a different, target language. More specifically, mobile computing device 4A sends the encoded audio signals within one or more encoded voice packets 52A via cellular communication session 55B to voice translation service 20. The one or more encoded voice packets 52A may include Internet Protocol (IP) packets that encapsulate the encoded audio signals for transport on an IP infrastructure that includes cellular network 6 and public network 12. The one or more encoded voice packets 52A may represent Voice-over-IP packets that included the encoded audio signals in accordance with a Real-time Transport Protocol (RTP).

In response to receiving the one or more encoded voice packets 52A including encoded audio signals from mobile computing device 4A, vocoder 24 decodes the encoded audio signals using an audio decoder to obtain the audio signals. The audio may represent spoken audio spoken, sung, or otherwise vocalized by a human or other animal, synthesized and output by a machine, or other forms of spoken audio. Vocoder 24 provides the audio signals to translate module 22 of voice translation service 20, which may recognize speech in the source language and convert the speech to data representing words in the source language. Translate module 22 may then process the data to determine translated data representing words in a target language (different from the source language) that express a similar meaning to that of the words in the source language. Translate module 22 may then synthesize the translated data to translated audio signals.

In some examples, vocoder 24 of voice translation service 20 may encode the translated spoken audio using a voice encoder to generate encoded translated audio signals. Voice translation service 20 may return the encoded translated audio signals to mobile computing device 4A included in one or more encoded translated voice packets 52B, which may conform to protocol encapsulation similar to those of encoded voice packets 52A.

Mobile computing device 4A receives encoded translated voice packets 52B and, in lieu of the encoded audio signals earlier generated by mobile computing device 4A, sends the encoded translated audio signals by cellular network 6 via cellular communication session 55A including radio bearer 56A to mobile computing device 4B. The encoded translated audio signals may correspond to the encoded audio signals in that the translated audio signals represent words in a target language translated from words in a source language and represented in the audio signals. Mobile computing device 4B may decode the encoded translated audio signals for output to a user of the mobile computing device 4B and, in this way, network system 2 may facilitate spoken audio language translation between users of mobile computing devices 4. By sending encoded voice signals, encoded using a voice encoder, rather than raw audio signals to the translation service, the techniques may reduce an amount of data uploaded to the voice translation service 20 for translation.

Although not illustrated explicitly in FIG. 2, mobile computing device 4B and voice translation service 20 may perform, for the cellular communication session, operations similar to those described above with respect to mobile computing device 4A and voice translation service 20, though using reciprocal source and target languages. For example, mobile computing device 4A and voice translation service 20 may translate English spoken audio to Chinese spoken audio for a cellular communication session, while mobile computing device 4B and voice translation service 20 may translate Chinese spoken audio to English spoken audio for the cellular communication session. In such examples, mobile computing devices 4A, 4B may facilitate communication by enabling two-way voice-to-voice language translation between the users.

In some examples, mobile computing device 4A establishes a VoIP communication session with mobile computing device 4B over cellular network 6 using a second data radio bearer for a second cellular communication session. In such examples, mobile computing device 4A may output translated encoded voice packets 52B via the VoIP communication session using the second cellular communication session, rather than the cellular communication session 55A.

Further, in some examples, mobile computing device 4A may establish call sessions with a telephone 25 physically connected to public switched telephone network (PSTN) 23, which generally represents circuit-switched telephone networks that are operated by national, regional, or local telephony operators, providing infrastructure and services for public telecommunication. In such examples, the techniques described above may similarly be applied for real-time, voice translation of the telephone call between mobile computing device 4A and telephone 25. At least in some cases, the telephone call between mobile computing device 4A and telephone 25 traverses a bearer of the cellular network 6 and therefore includes a cellular communication session.

In some examples, in addition to or alternatively to obtaining encoded translated voice packets 52B for encoded voice packets 52A, mobile computing device 4A may send, for translation, encoded audio signals within one or more encoded voice packets received from mobile computing device 4B via cellular communication session 55B. In this way, mobile computing device 4A may obtain encoded translated voice packets even if mobile computing device 4B (or telephone 25) is unable to send encoded translated voice packets cellular communication session 55A. In such examples, mobile computing device 4A may send the received encoded voice packets via cellular communication session 55B to voice translation service 20, and receive encoded translated voice packets via cellular communication session 55B in response. Mobile computing device 4A may decode the encoded translated audio signals in the received encoded translated voice packets to obtain translated audio signals for output, e.g., via an output device such as a speaker, to a user of the mobile computing device 4A. In this way, network system 2 may facilitate spoken audio language translation between users of mobile computing devices 4. In such examples, the source language for purposes of translation may refer to the language corresponding to audio obtained at mobile communication devices 4B, while the target language may refer to the language represented in audio signals output by mobile communication device 4A.

Figure 3:
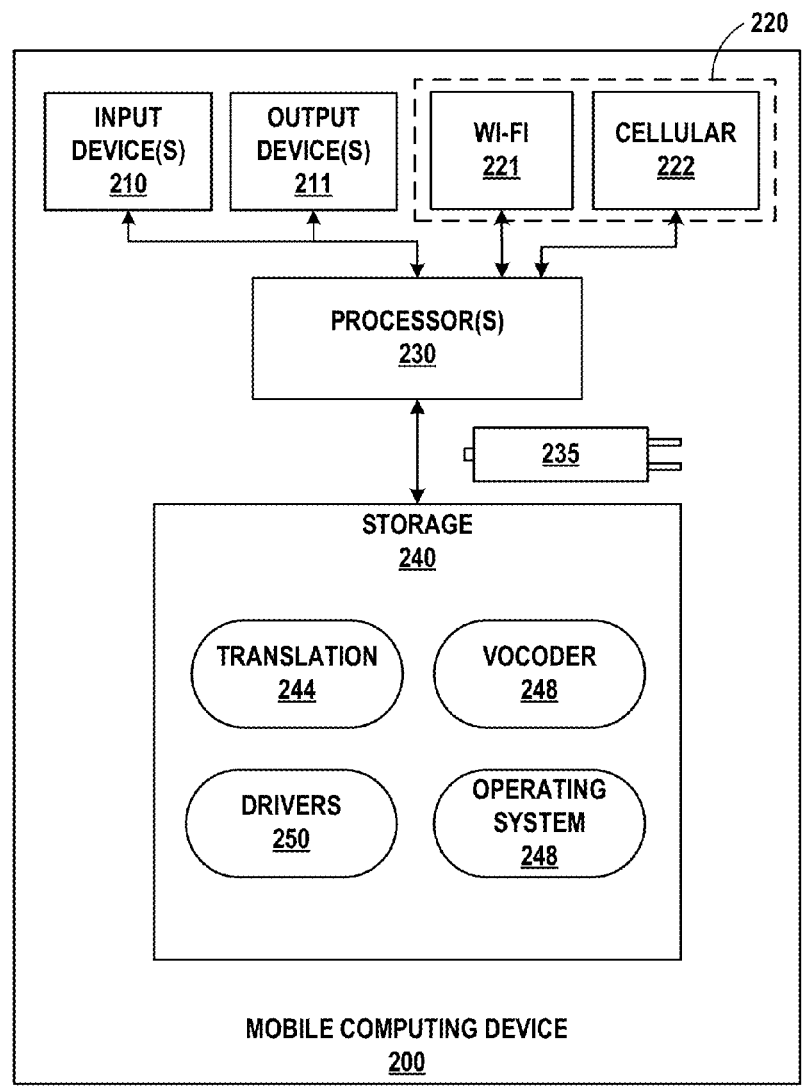
FIG. 3 is a block diagram illustrating an example mobile computing device that implements techniques for offloading language translation of encoded voice data in accordance with one or more aspects of the present disclosure.

FIG. 3 is a block diagram illustrating an example mobile computing device 200 that implements techniques for offloading language translation of encoded voice data in accordance with one or more aspects of the present disclosure. Computing system 200 is described below in the contexts of FIGS. 1-2. FIG. 3 illustrates only an example of computing system 200, and many other examples of computing system 200 may be used in other instances and each may include a subset of the components shown in FIG. 3, and/or each may include additional components not shown in FIG. 3.

Computing system 200 may include one or more input devices 210, one or more output devices 211, one or more communication units 220 including Wi-Fi communication unit 221 and cellular communication unit 222, one or more processors 230, and one or more storage devices 240. Computing system 200 may also include power source 235. Computing device 200, in one example, further includes translation module 244, vocoder 248, drivers 250, and operating system 248 that are executable by computing device 200. Each of components 210, 211, 220, 230, 240 are coupled (physically, communicatively, and/or operatively) for inter-component communications. In some examples, communication channels may include a system bus, a network connection, an inter-process communication data structure, or any other method for communicating data.

One or more input devices 210 of computing system 200 may generate, receive, or process input. Such input may include input from a keyboard, pointing device, voice responsive system, video camera, button, sensor, mobile device, control pad, microphone, presence-sensitive screen, network, or any other type of device for detecting input from a human or machine.

One or more output devices 211 may generate, receive, or process output. Examples of output are tactile, audio, visual, and/or video output. Output devices 211 of computing system 200 may include a display, sound card, video graphics adapter card, speaker, presence-sensitive screen, one or more USB interfaces, video and/or audio output interfaces, or any other type of device capable of generating tactile, audio, video, or other output. A display output device may include a cathode ray tube (CRT) monitor, liquid crystal display (LCD), Light-Emitting Diode (LED) display, or any other type of display device.

Power source 235 may provide power to one or more components of computing system 200. Power source 235 may receive power from the primary alternative current (AC) power supply in a building, home, or other location. In other examples, power source 235 may also be a battery. In still further examples, computing system 200 and/or power source 235 may receive power from another source.

One or more communication units 220 of computing system 200 may communicate with devices external to computing system 200 by transmitting and/or receiving data. In some examples, communication units 220 may communicate with over a network. Computing device 200 in the example of FIG. 3 has dual antennas for communicating with other devices via a wireless local area network and using a cellular network, respectively. For example, Wi-Fi communication unit 221 implements wireless local area network communication to wirelessly exchange layer 2 communications with another device. Wi-Fi communication unit 221 may include a Wi-Fi antenna, such as an inverted-F antenna or planar inverted-F antenna, that sends and receives radio signals in the Wi-Fi frequency bands. Wi-Fi communication unit 221 may include one or more hardware-based processors, integrated circuits, and programmable processors for processing signals for receipt or transmission via the Wi-Fi antenna according to Wi-Fi protocols. In some examples, aspects of Wi-Fi communication unit 221 are integrated in one or more processors 230.

Cellular communication unit 222 implements cellular communication to wirelessly exchange data with a cellular network base station. Cellular communication unit 22 may include one or more cellular antennas that sends and receive radio signals in the frequency bands for one or more of GSM, UMTS, LTE, or other cellular radio access networks. Cellular communication unit 222 may include one or more hardware-based processors, integrated circuits, and programmable processors for processing signals for receipt or transmission via the cellular antenna(s) according to cellular protocols, e.g., physical layer (CDMA, TDMA, FDMA, ODFM) and higher-layer protocols such as MAC, radio link control, packet data convergence protocol, and/or other protocols. In some examples, aspects of cellular communication unit 222 are integrated in one or more processors 230.

Other examples of communication units 220 may include a network interface card (e.g. such as an Ethernet card), an optical transceiver, a radio frequency transceiver, a GPS receiver, or any other type of device that can send and/or receive information. Other examples of communication units 220 may include Bluetooth® or other NFC and GPS radios found in mobile devices as well as Universal Serial Bus (USB) controllers and the like.

One or more processors 230 may implement functionality and/or execute instructions associated with computing system 200. Examples of processors 230 include microprocessors, application processors, display controllers, auxiliary processors, one or more sensor hubs, and any other hardware configured to function as a processor, a processing unit, or a processing device. Computing system 200 may use one or more processors 230 to perform operations in accordance with one or more aspects of the present disclosure using software, hardware, firmware, or a mixture of hardware, software, and firmware residing in and/or executing at computing system 200.

One or more storage devices 240 within computing system 200 may store information for processing during operation of computing system 200. In some examples, one or more storage devices 240 are temporary memories, meaning that a primary purpose of the one or more storage devices is not long-term storage. Storage devices 240 on computing system 200 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 240, in some examples, also include one or more computer-readable storage media. Storage devices 240 may be configured to store larger amounts of information than volatile memory. Storage devices 240 may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories. Storage devices 240 may store program instructions and/or data associated with one or more of the modules described in accordance with one or more aspects of this disclosure.

One or more processors 230 and one or more storage devices 240 may provide an operating environment or platform for one or one more modules, which may include a combination of hardware, firmware, and software. For instance, one or more processors 230 may execute instructions and one or more storage devices 240 may store instructions and/or data of one or more modules. The combination of processors 230 and storage devices 240 may retrieve, store, and/or execute the instructions and/or data of one or more applications, modules, or software. Processors 230 and/or storage devices 240 may also be operably coupled to one or more other software and/or hardware components, including, but not limited to, one or more of the components illustrated in FIG. 3.

Computing device 200 may include operating system 248. Operating system 248, in some examples, controls the operation of components of computing device 200. For example, operating system 248, in one example, facilitates the communication of one or more applications with processors 230, communication unit(s) 220, storage device 240, input device(s) 210, and output device(s) 211.

One or more drivers 250 may operate to control computing device 200 hardware, such as communication units 220 and, in some cases, application-specific or other special-purpose hardware to execute vocoder 248. Vocoder 248 is a voice codec that converts an analog audio signal (or a raw bitstream, e.g., pulse code modulation (PCM) bitstream) to digitally encoded signals, and vice-versa. Vocoder 248 includes an audio codec or voice codec, such as G.711 or other ITU standard codec, internet Speech Audio Codec (iSAC), QCELP (Qualcomm Code Excited Linear Prediction), and Adaptive Multi-Rate (AMR).

Vocoder 248 in this example packetizes the digitally encoded signals to generate one or more voice packets from the digitally encoded signals for transmission by communication units 220, in accordance with one or more aspects of the present disclosure. Vocoder 248 may receive one or more voice packets by communication units 220, the one or more voice packets transporting digitally encoded signals. Vocoder 248 may extract digitally encoded signals from the one or more received voice packets and convert the digitally encoded signals to an analog audio signal for output by one of output device(s) 211, e.g., a speaker.

Translation module 244 may operate to offload voice packets, generated by vocoder 248, to an external translation service in accordance with one or more aspects of the present disclosure. Translation module 244 may intercept voice packets for transmission and, in some examples, output the voice packets via Wi-Fi communication unit 221 to the external translation service. Translation module 244 may receive translated voice packets via Wi-Fi communication unit 221, responsive to the voice packets. In some examples, translation module 244 may output the voice packets via cellular communication unit 222 to the external translation service. In such cases, translation module 244 may receive translated voice packets via cellular communication unit 222, responsive to the voice packets. Cellular communication unit 222 may transmit the translated voice packets to a base station using a cellular communication session between mobile computing device 200 and another mobile computing device.

Figure 5:
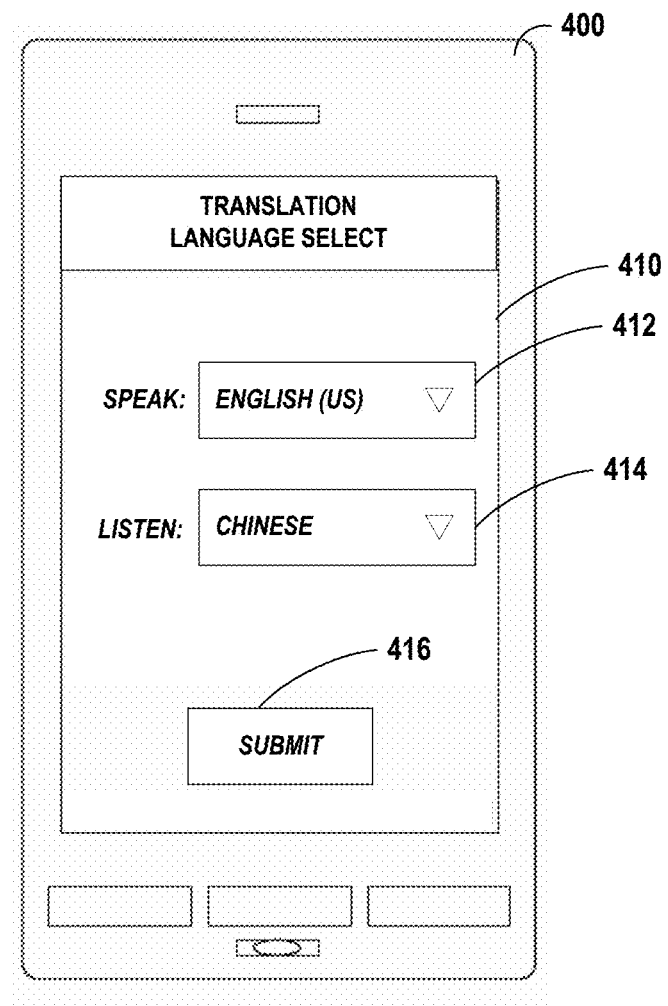
FIG. 5 is a schematic diagram of an example mobile computing device that operates according to techniques described in this disclosure.

Translation module 244 may generate a user interface that includes user interface elements for selecting a target language and, in some cases, a source language for translation. Translation module 244 may output the user interface for display by output device(s) 211 to a user. Input device(s) may detect user input to the user interface. Translation module 244 may process the user input to determine the user has selected a target language and, in some cases, a source language for translation. Translation module 244 may direct voice translation service 20 to translate, to the selected target language, words represented in encoded voice packets from mobile computing device 200 to generate corresponding encoded translated voice packets. As further discussed below, FIG. 5 illustrates an example user interface output by translation module 244.

Although certain modules, components, programs, executables, data items, functional units, and/or other items included within storage device 240 may have been illustrated separately, one or more of such items could be combined and operate as a single module, component, program, executable, data item, or functional unit. For example, one or more modules may be combined or partially combined so that they operate or provide functionality as a single module. Further, one or more modules may operate in conjunction with one another so that, for example, one module acts as a service or an extension of another module. Also, each module, component, program, executable, data item, functional unit, or other item illustrated within storage device 240 may include multiple components, sub-components, modules, sub-modules, and/or other components or modules not specifically illustrated.

Figure 4:
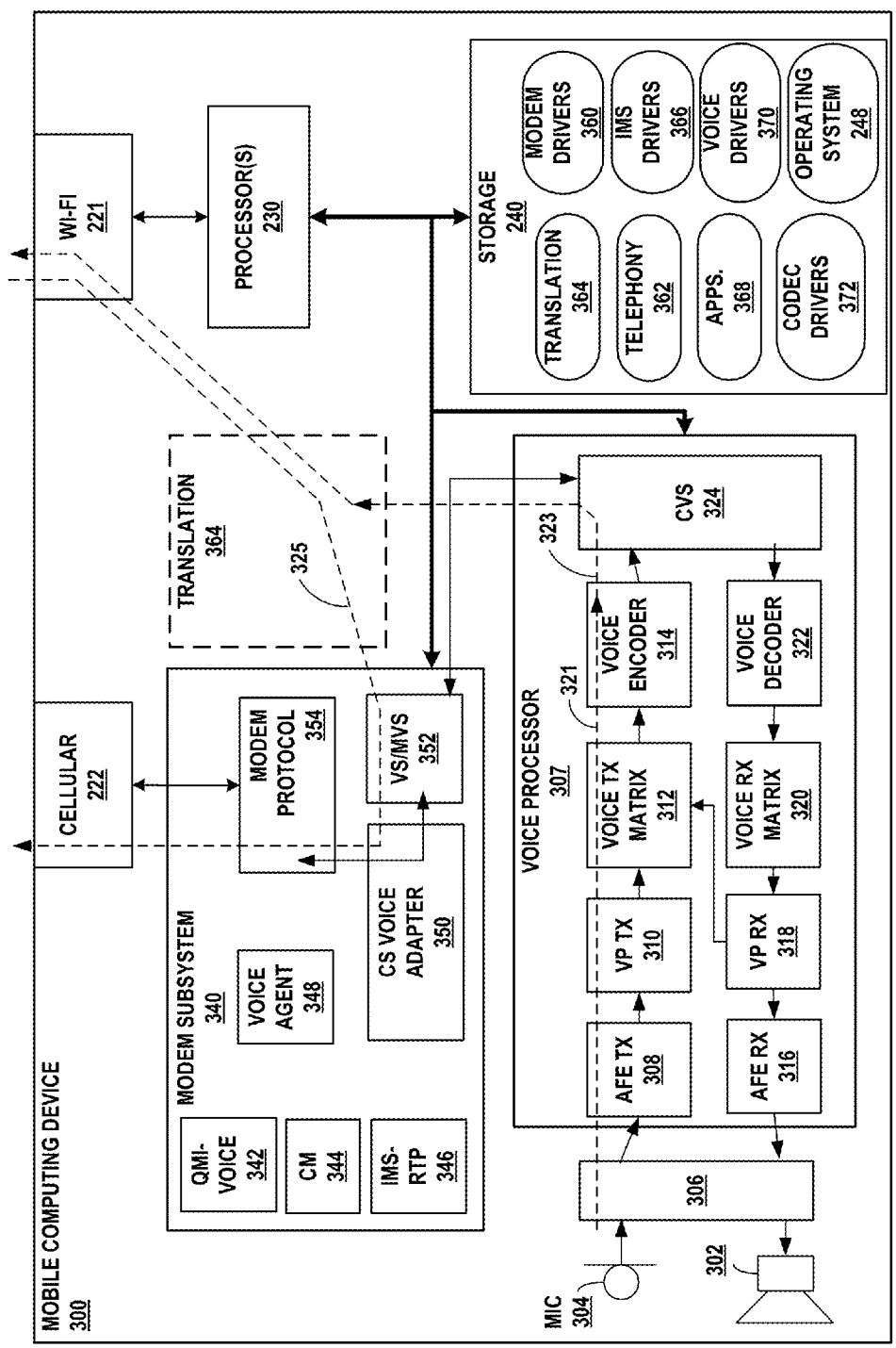
FIG. 4 is a block diagram illustrating an example mobile computing device, in further detail, that operates according to techniques described in this disclosure.

FIG. 4 is a block diagram illustrating an example mobile computing device, in further detail, that operates according to techniques described in this disclosure. Mobile computing device 300 may represent an example instance of mobile computing device 200.

Mobile computing device 300 is operably coupled to a microphone 304 and speaker 302. Microphone 304 may in some examples be integrated into the mobile computing device 300, or microphone 304 may represent any external microphone, such as a headset microphone, or a Bluetooth or other Near-Field Communication (NFC) microphone. Mobile computing device 300 receives analog signals from microphone 304. Speaker 306 may in some examples be integrated into the mobile computing device 300, or speaker 306 may represent any external speaker, such as headphones, headset, or Bluetooth or other NFC speaker.

In some examples, mobile computing device 300 receives analog signals from microphone 304, which audio codec 306 converts to digital signals. The digital signals may be a pulse code modulated (PCM) stream or other modulated bitstream that represents the analog signals in digital form. In examples in which mobile computing device 300 receives digitally-encoded data from microphone 304 (e.g., via NFC), voice processor 307 may operate on the digitally-encoded data. Audio codec 306 may include at least one analog-to-digital converter (ADC) to convert analog signals to digital signals for encoding by voice processor 307.

Voice processor 307 includes front end transmitter ("AFE TX") 308, voice processor transmitter ("VP TX") 310, voice transmitter matrix ("Voice TX Matrix") 312, and voice encoder 314, that form an encoding path 321 to generate encoded voice packets 323 (alternatively referred to herein as "vocoder packets") for transmission by mobile computing device 300.

Voice processor 307 includes front end receiver ("AFE RX") 316, voice processor receiver ("VP RX") 318, voice receiver matrix ("Voice RX Matrix") 320, and voice decoder 322, that form a decompression/decoding path to generate digital signals from encoded voice packets for conversion by audio codec 306 and output to speaker 302.

Voice encoder 314 and voice decoder 322 may together represent example instances of aspects of vocoder 248 of FIG. 2. Voice encoder 314 generates encoded voice packets from a digital bitstream (e.g., a PCM bitstream) output by voice transmitter matrix 312. In some cases, voice encoder 314 and voice decoder 322 are implemented using a common voice coder. CVS 324 processes the encoded voice packets. CVS 324 manages voice stream configuration for both the voice encoder 314 and the voice decoder 322 and exchanges downlink and uplink voice packets between MVS and other components of voice processor 307, which may be executed by a digital signal processor.

The cellular transmission path for mobile computing device 300 includes modem subsystem 340, which operates the physical layer for cellular transmission via cellular communication unit 222. Modem subsystem 340 includes voice module 342, IP Multimedia Subsystem-RTP ("IMS-RTP") 346, voice agent 348, voice adapter 350, modem protocol layers module 354, and voice services (VS)/multimode voice services (MVS) 352. MVS 352 provides the main interface between protocol stacks, such as 1×, Global System for Mobile communication (GSM), Wideband Code Division Multiplexing Access (WCDMA), or Time Division Synchronous Code Division Multiple Access (TD-SCDMA), and vocoder firmware (e.g., executed by voice processor 307). MVS 352 is the gateway for modem protocols to establish vocoder packet exchange and rate control. Upon initiation or receipt of a new voice call, MVS 352 clients configure and enable a vocoder path before the call is established. VS is an enhanced version of MVS and is designed for more flexibility and efficient concurrency control between multiple clients. VS/MVS 352 may support VS and/or MVS. Modem subsystem 340 outputs, by cellular communication unit 222, encoded voice packets and encoded translated voice packets converted to digital signals for transmission by a cellular radio bearer.

Mobile computing device 300, in one example, further includes translation module 264, telephony 362, one or more applications 368, codec drivers 372, operating system 248, voice drivers 370, IMS drivers 366, and modem drivers 360 that are executable by computing device 200. Modem drivers 360 may be executed by mobile computing device 300 to control operations of modem subsystem 340. Voice drivers 370 may be executed by mobile computing device 300 to control operations of voice processor 307. Codec drivers 372 may be executed by mobile computing device 300 to control operations of audio codec 306. IMS drivers 366 may be executed by mobile computing device 300 to control operations of IMS-RTP component 346 of modem subsystem 340.

Telephony application 362 may be executed by computing device to establish and operate cellular communication sessions with another mobile computing device using a cellular network. Telephony application 362 may generate and output user interfaces and process user inputs, received by input devices (not shown in FIG. 4), for establishing cellular communication sessions.

Telephony application 362 and translation module 364 provide a translation option for cellular communication sessions in which mobile computing device 300 sends encoded voice packets to a translation service for translation to a target language. A user may select translation mode for a cellular communication session before or during the cellular communication session. Mobile computing device 300 receives responsive encoded translated voice packets from the translation service and modem subsystem 340 outputs the encoded translated voice packets for a cellular communication session by cellular communication unit 222. Translation module 364 may represent an example instance of translation module 244 of FIG. 3.

In the example of FIG. 4, when a cellular communication session is in translation mode, translation module 364 is positioned on the cellular transmission data path 321 internal to mobile computing device 300 so as to intercept encoded voice packets 323 for the cellular communication session prior to delivery to modem subsystem 340. In such examples, translation module 364 may be executed as part of CVS 324. For example, translation module 364 may determine that encoded voice packets 323 for a cellular communication session in translation mode are to be redirected to a remote translation service. Translation module 364 causes Wi-Fi communication unit 221 to output the encoded voice packets via a broadband access network 10 to voice translation service 20. Translation module 364 receives encoded translated voice packets 325, responsive to the encoded voice packets 323, and injects the encoded translated voice packets 325 into the cellular transmission data path 321 for output by cellular output device according to the cellular communication session. For instance, translation module 364 may indicate to modem subsystem 340 that the encoded translated voice packets 325 are ready for transmission. In some examples, translation module 364 may modify encoded voice packets 323 to include an indication of the requested target language prior to sending the encoded voice packets 323 to the translation service. In some examples, translation module 364 may send to the translation service an indication of the type of voice encoding (e.g., an indication of the voice encoder 314) used to generate encoded voice packets 323. Translation module 22 of the voice translation service 20 may apply the same type of voice encoding to generate encoded translated voice packets 325 from encoded voice packets 323, in response to the indication. For example, translation module 22 may receive the indication of the type of voice encoding used by mobile computing device 300 for generating encoded voice packets and select a corresponding voice encoder to apply to generate encoded translated voice packets.

Alternatively, or additionally for some cellular communication sessions, translation module 364 may send encoded voice packets 323 by cellular communication unit 222 and receive encoded translated voice packets 325 by cellular communication unit 222, using a radio bearer separate from the radio bearer for the cellular communication session.

Alternatively, or additionally for some cellular communication sessions, when a cellular communication session is in translation mode, translation module 364 is positioned on a cellular receive data path (not shown) internal to mobile computing device 300 so as to intercept encoded voice packets for the cellular communication session received by modem subsystem 340 via cellular communication unit 222. In such examples, translation module 364 may be executed as part of VS/MVS 352. For example, translation module 364 may determine that encoded voice packets, received from another mobile computing device for instance, for a cellular communication session in translation mode are to be redirected to a remote translation service. Translation module 364 causes Wi-Fi communication unit 221 to output the encoded voice packets via a broadband access network 10 to voice translation service 20. Translation module 364 receives encoded translated voice packets, responsive to the encoded voice packets, and injects the encoded translated voice packets into the cellular receive data path decoding by voice processor 307 to obtain digital audio signals from encoded voice packets for conversion by audio codec 306 and output to speaker 302. For instance, translation module 364 may indicate to voice processor 307 that the encoded translated voice packets are ready for decoding and output. In some examples, translation module 364 may modify encoded voice packets to include an indication of the requested target language prior to sending the encoded voice packets to the translation service. In some examples, translation module 364 may send to the translation service an indication of the type of voice encoding used to generate encoded voice packets. Translation module 22 of the voice translation service 20 may apply the same type of voice encoding to generate encoded translated voice packets from the encoded voice packets, in response to the indication. For example, translation module 22 may receive the indication of the type of voice encoding used by mobile computing device 300 for generating encoded voice packets and select a corresponding voice encoder to apply to generate encoded translated voice packets.

FIG. 5 is a schematic diagram of an example mobile computing device that operates according to techniques described in this disclosure. Mobile computing device 400 may represent an example instance of mobile computing devices 4A, 200, or 300. Mobile computing device includes a display that outputs a user interface 410 for selecting a source and target translation language for a cellular communication session. User interface 410 includes user element 412 for selecting the source translation language, which specifies a language of the encoded voice packets for translation and corresponds to the language of the words being spoken by a user of mobile computing device 400. User interface 410 also includes user element 414 for selecting the target translation language, which determines a language to which a translation service is to translate encoded voice packets to encoded translated voice packets. User interface 410 includes a user element 416 to submit the selected source and target translation languages. A translation module 244, 364 may provide an indication of the selected source and target translation languages for one or more encoded voice packets to a translation service.

Figure 6:
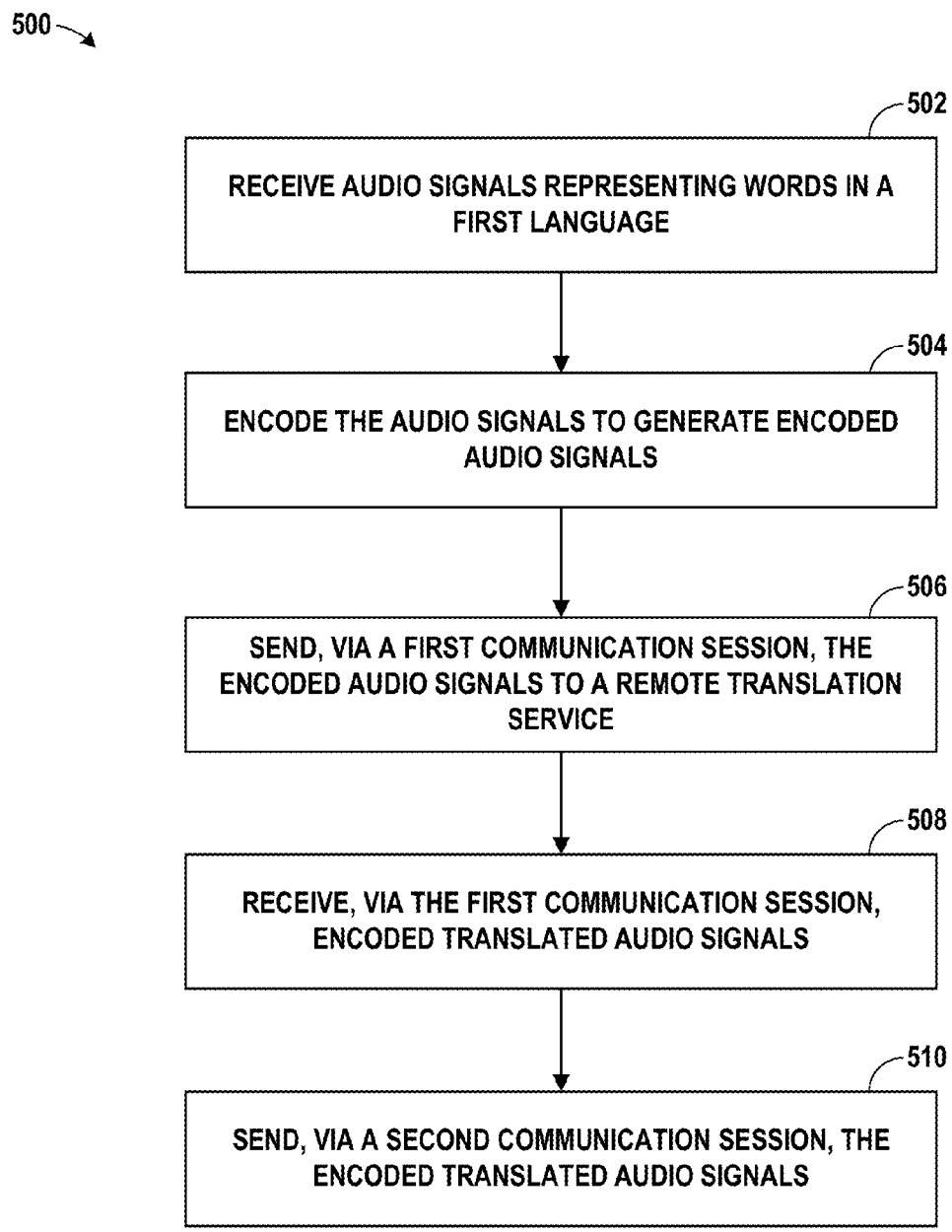
FIG. 6 is a flow diagram illustrating an example mode of operation for a mobile computing device, according to techniques described in this disclosure.

FIG. 6 is a flow diagram illustrating an example mode of operation for a mobile computing device, according to techniques described in this disclosure. Mode of operation 500 is described with respect to mobile computing device 200 but may be performed by any example of a mobile computing devices described in this disclosure. Mobile computing device 200 receives audio signals that represent words verbalized in a first language (502). The audio signals may represent analog audio signals or digital audio signals received or generated by one of input devices 210. Mobile computing device 200 applies a voice encoder to encode the audio signals to generate encoded audio signals (504). The encoded audio signals may be voice packets.

Mobile computing device 200 sends, via a first communication session over a network, the encoded audio signals to a remote translation service for translation of the represented words to a second language (506). Mobile computing device 200 subsequently receives, via the first communication session, encoded translated audio signals corresponding to the encoded audio signals (508). Mobile computing device 200 sends, via a second communication session with another telephony device, the encoded translated audio signals (510).

For processes described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically might be alternatively not performed automatically, but rather, such operations, acts, steps, or events might be, in some examples, performed in response to input or another event.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments of the invention have been described. These and other embodiments are within the scope of the following claims.

What is claimed is:

1. A mobile computing device comprising:
a memory;
at least one processor operably coupled to the memory;
a voice processor;
a modem subsystem; and
a translation module,
wherein the voice processor is configured to:
    receive electronic analog audio signals, generated by an input device responsive to receiving audio input, representing one or more words in a first language;
    digitize the electronic analog audio signal to produce a stream of digitized audio samples; and
    encode, with a voice encoder of the mobile computing device, the stream of digitized audio samples to generate one or more encoded voice packets,
wherein the translation module is configured to:
    intercept the one or more encoded voice packets from the voice processor on a data path to the modem subsystem;
    send the one or more encoded voice packets to a remote voice translation service;
    receive, from the remote voice translation service, one or more encoded translated voice packets, wherein the one or more encoded translated voice packets represent one or more words in a second language translated from the one or more words in the first language;
    inject the one or more encoded translated voice packets to the modem subsystem, and
wherein the modem subsystem is configured to output the one or more encoded translated voice packets via a cellular communication session over a cellular network.

2. The mobile computing device of claim 1, further comprising:
a cellular communication unit,
wherein the translation module is configured to:
send, by the cellular communication unit, the one or more encoded voice packets to the remote translation service; and
receive, by the cellular communication unit, the one or more encoded translated voice packets from the remote translation service.

3. The mobile computing device of claim 1,
wherein the cellular communication session comprises a first cellular communication session, and
wherein the modem subsystem is configured to:
establish a first radio bearer for the first cellular communication session;
establish a second radio bearer for a second cellular communication session over the cellular network,
wherein the translation module is configured to:
send, via the second cellular communication session, the one or more encoded voice packets to the remote translation service; and
receive, via the second cellular communication session, the one or more encoded translated voice packets from the remote translation service.

4. The mobile computing device of claim 1, further comprising:
a cellular communication unit;
a Wi-Fi communication unit,
wherein the translation module is configured to:
send, using the Wi-Fi communication unit, the one or more encoded voice packets to the remote translation service; and
receive, using the Wi-Fi communication unit, the one or more encoded translated voice packets from the remote translation service,
wherein the modem subsystem is configured to send, using the cellular communication unit via the cellular communication session over the cellular network, the one or more encoded translated voice packets.

5. The mobile computing device of claim 1, wherein the translation module is configured to:
send an indication of the second language to the remote translation service.

6. The mobile computing device of claim 1, wherein the translation module is configured to:
send an indication of the voice encoder to the remote translation service.

7. The mobile computing device of claim 1, wherein the translation module is configured to:
generate, for output to a display, a user interface comprising a user element for selecting a language;
receive, after outputting the user interface, an indication of user input;
determine, based on the indication of user input, a user selected the second language; and
send, based on the determining, an indication of the second language to the remote translation service.

8. A method comprising:
receiving, by a voice processor of a mobile computing device, electronic analog audio signals, generated by an input device responsive to receiving audio input, representing one or more words in a first language;
digitizing, by the voice processor, the electronic analog audio signal to produce a stream of digitized audio samples;
encoding, by the voice processor with a voice encoder, the stream of digitized audio samples to generate one or more encoded voice packets;
intercepting, by a translation module of the mobile computing device, the one or more encoded voice packets from the voice processor on a data path to a modem subsystem of the mobile computing device;
sending, by the translation module, the one or more encoded voice packets to a remote voice translation service;

receiving, by the translation module from the remote voice translation service, encoded translated voice packets, wherein the one or more encoded translated voice packets represent one or more words in a second language translated from the one or more words in the first language;

injecting, by the translation module, the one or more encoded translated voice packets to the modem subsystem; and outputting, by the modem subsystem, the one or more encoded translated voice packets via a cellular communication session over a cellular network.

9. The method of claim 8, further comprising:

sending, by translation module using a cellular communication unit of the mobile computing device, the one or more encoded voice packets to the remote translation service; and receiving, by translation module using the cellular communication unit of the mobile computing device, the one or more encoded translated voice packets from the remote translation service.

10. The method of claim 8, wherein the cellular communication session comprises a first cellular communication session, the method further comprising:

establishing, by the modem subsystem, a first radio bearer for the first cellular communication session;

establishing, by the modem subsystem, a second radio bearer for a second cellular communication session over the cellular network;

sending, by the translation module using the modem subsystem and via the second cellular communication session, the one or more encoded voice packets to the remote translation service; and receiving, by the translation module using the modem subsystem and via the second cellular communication session, the one or more encoded translated voice packets from the remote translation service.

11. The method of claim 8, further comprising:

send, by the translation module using a Wi-Fi communication unit of the mobile computing device, the one or more encoded voice packets to the remote translation service;

receive, by the translation module using the Wi-Fi communication unit of the mobile computing device, the one or more encoded translated voice packets from the remote translation service; and send, by the translation module using a cellular communication unit of the mobile computing device via the cellular communication session over the cellular network, the one or more encoded translated voice packets.

12. The method of claim 8, further comprising:

sending, by the translation module, an indication of the second language to the remote translation service.

13. The method of claim 8, further comprising:

sending, by the translation module, an indication of the voice encoder to the remote translation service.

14. The method of claim 8, further comprising:

generating, by the translation module for output to a display, a user interface comprising a user element for selecting a language;

receiving, by the translation module after outputting the user interface, an indication of user input;

determining, by the translation module based on the indication of user input, a user selected the second language; and sending, by the translation module based on the determining, an indication of the second language to the remote translation service.

15. A mobile computing device comprising:

a memory;

at least one processor operably coupled to the memory, a voice processor;

a modem subsystem; and a translation module, wherein the modem subsystem is configured to:

receive, via a cellular communication session over a cellular network, one or more encoded voice packets representing one or more words in a first language, wherein the translation module is configured to:

intercept the one or more encoded voice packets from the modem subsystem on a data path to the voice processor;

send the one or more encoded voice packets to a remote voice translation service;

receive, from the remote voice translation service, one or more encoded translated voice packets that represent one or more words in a second language translated from the one or more words in the first language;

inject the one or more encoded translated voice packets to the voice processor, wherein the voice processor is configured to:

decode, with a voice decoder of the mobile computing device, the one or more encoded translated voice packets to obtain a stream of digitized audio samples; and output, for output as audio signals by an output device, the stream of digitized audio samples.

16. A system comprising:

one or more translation servers configured to execute a remote translation service;

a mobile computing device comprising a voice processor, a modem subsystem, and a translation module, wherein the voice processor is configured to:

receive electronic analog audio signals, generated by an input device responsive to receiving audio input, representing one or more words in a first language;

digitize the electronic analog audio signal to produce a stream of digitized audio samples;

encode, with a voice encoder of the mobile computing device, the stream of digitized audio samples to generate one or more encoded voice packets; and wherein the translation module is configured to:

intercept the one or more encoded voice packets from the voice processor on a data path to the modem subsystem;

send the one or more encoded voice packets to a remote voice translation service, wherein the one or more translation servers are configured to:

receive the one or more encoded voice packets;

decode the one or more encoded voice packets to obtain the stream of digitized audio samples;

translate the one or more words in a first language to one or more words in a second language;

synthesize the one or more words in the second language to generate a translated stream of digitized audio samples;

encode the translated stream of digitized audio samples to generate encoded translated voice packets; and send the encoded translated voice packets to the mobile computing device, wherein the translation module is configured to:
   receive, from the remote voice translation service, one or more encoded translated voice packets, wherein the one or more encoded translated voice packets represent one or more words in a second language translated from the one or more words in the first language; and
   inject the one or more encoded translated voice packets to the modem subsystem
wherein the modem subsystem is configured to output, via a cellular communication session over a cellular network, the encoded translated voice packets.

\* \* \* \* \*